No. 884,217. PATENTED APR. 7, 1908.
H. SCHUESSLER.
LAUGHING MIRROR.
APPLICATION FILED JULY 10, 1907.

Witnesses

Inventor
Henry Schuessler
By Victor J. Evans
Attorney

UNITED STATES PATENT OFFICE.

HENRY SCHUESSLER, OF PERU, ILLINOIS.

LAUGHING-MIRROR.

No. 884,217.  Specification of Letters Patent.  Patented April 7, 1908.

Application filed July 10, 1907. Serial No. 383,113.

*To all whom it may concern:*

Be it known that I, HENRY SCHUESSLER, a citizen of the United States of America, residing at Peru, in the county of Lasalle and State of Illinois, have invented new and useful Improvements in Laughing-Mirrors, of which the following is a specification.

This invention relates to laughing mirrors, and one of the principal objects of the same is to provide improved means for securing a flexible metal mirror in a frame, said means comprising corrugated sections which will clamp the metallic mirror in the frame to conform to the contour of said sections.

Another object of the invention is to provide means for giving to the mirror the required corrugations by forming the frame sections of the required contour, and providing clamps for holding the frame sections together so that in case of injury to the mirror a new one can be readily inserted in place of the injured one.

Figure 1:
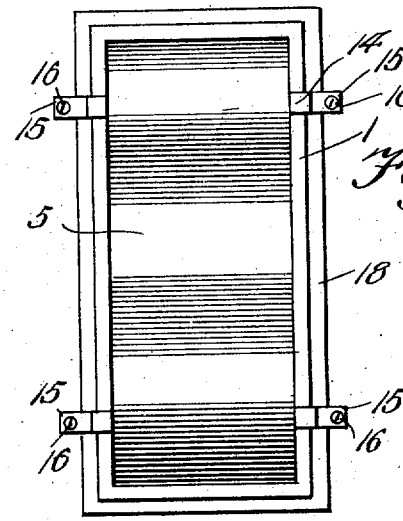
Figure 2:
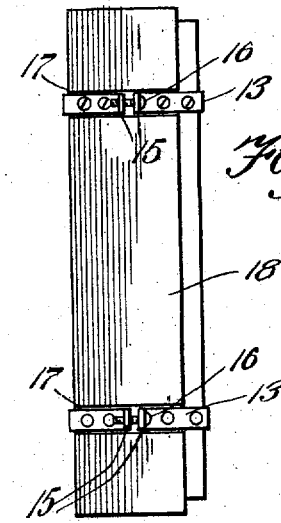
Figure 3:
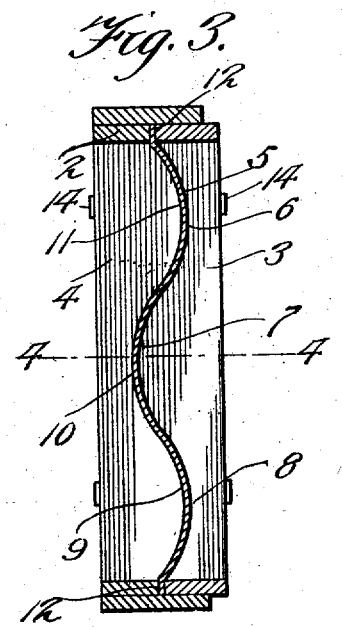
Figure 4:
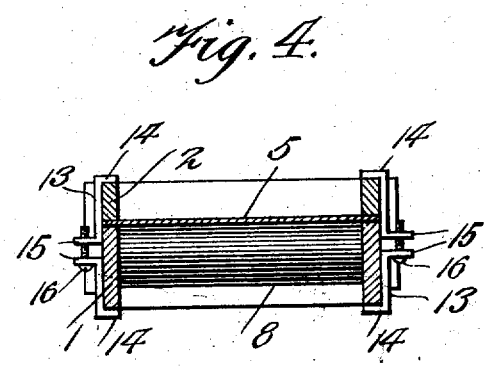

These and other objects may be attained by means of the construction illustrated in the accompanying drawing, in which:

Figure 1 is a front elevation of a laughing mirror made in accordance with my invention. Fig. 2 is a side elevation of the same. Fig. 3 is a central longitudinal section; and Fig. 4 is a horizontal section on the line 4—4, Fig. 3.

Referring to the drawing for a more particular description of my invention, the numeral 1 designates one of the sections of the inner frame, and 2 is the other section thereof, said frame sections each having the side members 3 and 4 formed with curved edges which conform to the curvature of the flexible metallic mirror 5. The section 3 is thus provided with a concaved portion 6, a convex portion 7, and a concaved portion 8, while the section 4 is provided with a convex portion 9, a concave portion 10, and a convex portion 11. When these two members are brought together with the mirror 5 between them, the mirror is given the same contour as the two members 3 and 4, as will be obvious, while the ends 12 of the metallic mirror will be held between the upper and lower bars of the two sections 1 and 2. To hold the two sections 1 and 2 together, I have provided suitable clamps 13 having inwardly turned lugs 14 which engage the edges of the sections 1 and 2 and outwardly turned lugs 15 through which adjusting bolts 16 pass for drawing together the two members 1 and 2 and clamping the mirror plate between them. The clamps 13 are seated in recesses 17 in the side portions of the outer frame 18.

From the foregoing it will be obvious that by forming the side pieces 3 and 4 with coincidently arranged concave and convex portions, the mirror is flexible and made to assume the same shape as the side pieces. Hence I do not desire to be limited to the exact curvatures shown in the drawing, as these curvatures may be varied to a considerable extent without departing from the spirit or scope of my invention.

Having thus described the invention, what I claim is:

1. A laughing mirror comprising a sectional frame, the side bars of which are provided with curved inner edges, a mirror plate placed between said members and clamping devices for holding said mirror in place with its surface corrugated.

2. A laughing mirror comprising a flexible, metal mirror plate, and a frame for holding said mirror in place, said frame comprising two sections provided with counterpart curved inner edges, and clamps for clamping said two sections together with the mirror plate between them.

3. In a device of the character described, the combination of a frame made up of two sections having curved inner edges, a metal mirror clamped between said frame members and an outer frame surrounding both said members.

In testimony whereof, I affix my signature in presence of two witnesses.

HENRY SCHUESSLER.

Witnesses:
JOSEPH J. LINNIG,
HENRY REAM.